(12) United States Patent
Pourtier et al.

(10) Patent No.: US 8,002,506 B2
(45) Date of Patent: Aug. 23, 2011

(54) METHOD OF FASTENING A GUARD RAIL BY MEANS OF A GUARD RAIL BOLT, THE GUARD RAIL BOLT AND THE TOOL FOR FASTENING THE GUARD RAIL BOLT

(75) Inventors: Fabrice Pourtier, Portes les Vallence (FR); Christian Ricordi, Bourg les Valence (FR)

(73) Assignee: Societe de Prospection et d'Inventions Techniques SPIT, Bourg les Valence (FR)

( * ) Notice: Subject to any disclaimer, the term of this patent is extended or adjusted under 35 U.S.C. 154(b) by 1354 days.

(21) Appl. No.: 10/599,759

(22) PCT Filed: Apr. 6, 2005

(86) PCT No.: PCT/IB2005/000898
§ 371 (c)(1),
(2), (4) Date: Oct. 6, 2006

(87) PCT Pub. No.: WO2005/098244
PCT Pub. Date: Oct. 20, 2005

(65) Prior Publication Data
US 2007/0209816 A1   Sep. 13, 2007

(30) Foreign Application Priority Data
Apr. 8, 2004 (FR) .................................... 04 03675

(51) Int. Cl.
*F16B 13/06* (2006.01)
*B23P 11/00* (2006.01)

(52) U.S. Cl. .............. 411/57.1; 411/60.1; 411/60.2; 411/52; 29/432; 29/525.02; 29/525.05; 29/525.11

(58) Field of Classification Search .............. 411/57.1, 411/60.1, 60.2, 52; 29/432, 525.01, 525.02, 29/525.05, 525.06, 525.11
See application file for complete search history.

(56) References Cited

U.S. PATENT DOCUMENTS

| 3,523,482 | A | * | 8/1970 | Ploch et al. ............... 411/49 |
| 4,015,826 | A |   | 4/1977 | Lauzier |
| 4,640,654 | A | * | 2/1987 | Fischer et al. ............ 411/55 |
| 4,904,134 | A | * | 2/1990 | Fischer ................... 411/54 |
| 4,940,372 | A | * | 7/1990 | Fischer ................... 411/32 |
| 4,943,195 | A | * | 7/1990 | Fischer ................... 411/55 |
| 4,986,711 | A | * | 1/1991 | Fischer ................... 411/55 |
| 5,032,046 | A | * | 7/1991 | Fischer ................. 411/82.3 |

(Continued)

FOREIGN PATENT DOCUMENTS

DE   3524284 A1   1/1987

(Continued)

*Primary Examiner* — Essama Omgba
(74) *Attorney, Agent, or Firm* — Lowe Hauptman Ham & Berner LLP

(57) ABSTRACT

A self-expanding and self-undercutting guard rail bolt includes a dowel having a guard rail fastening end and a ring. The fastening end is configured to be driven in rotation, and the ring is configured to rigidly connect to a first screwing end of the dowel by an incipient fracture portion. The self-expanding and self-undercutting guard rail bolt further includes a counter-dowel screwed to the dowel by a second screwing end. The counter-dowel includes an expansion cone, and an anti-rotation head having at least one edge which projects beyond a periphery of the dowel to prevent rotation of the counter-dowel about an axis of the guard rail bolt.

11 Claims, 3 Drawing Sheets

U.S. PATENT DOCUMENTS

| | | | | |
|---|---|---|---|---|
| 5,314,277 | A * | 5/1994 | Fischer | 411/55 |
| 5,690,455 | A * | 11/1997 | Fischer et al. | 411/55 |
| 6,524,045 | B2 * | 2/2003 | Pourtier | 411/60.1 |
| 6,827,535 | B2 * | 12/2004 | Fuchs et al. | 411/44 |
| 6,942,439 | B2 * | 9/2005 | Rouger | 411/61 |
| 7,357,613 | B2 * | 4/2008 | Houck et al. | 411/60.3 |
| 2004/0096288 | A1 * | 5/2004 | Haug et al. | 411/57.1 |
| 2004/0253075 | A1 * | 12/2004 | Liebig et al. | 411/57.1 |
| 2006/0115343 | A1 * | 6/2006 | Hartney et al. | 411/60.1 |
| 2009/0274533 | A1 * | 11/2009 | Zimmer et al. | 411/49 |
| 2009/0274534 | A1 * | 11/2009 | Zimmer et al. | 411/57.1 |

FOREIGN PATENT DOCUMENTS

| | | |
|---|---|---|
| EP | 0412257 A2 | 2/1991 |

* cited by examiner

METHOD OF FASTENING A GUARD RAIL BY MEANS OF A GUARD RAIL BOLT, THE GUARD RAIL BOLT AND THE TOOL FOR FASTENING THE GUARD RAIL BOLT

RELATED APPLICATIONS

The present application is a National Phase entry of International Application Number PCT/IB2005/000898, filed Apr. 6, 2005, which claims priority from, French Application No. 0403675, filed Apr. 8, 2004, the disclosure of which is hereby incorporated by reference herein in its entirety.

BACKGROUND

This invention relates to bolts used in the building industry serving to fasten guard rails to concrete slabs, e.g. apartment balcony slabs, and referred to as guard rail bolts.

These bolts traverse the shoes of these guard rails via holes provided to this end and are driven into the concrete drilled in advance. Each shoe is held against the slab by virtue of a nut screwed on to the threaded head of the bolt and mounted on the plate in which the holes in the shoe have been provided.

In order to fix a bolt, the concrete slab is drilled to a sufficient length, to the diameter of the bolt, opposite each hole in the shoe, the bolt is driven in by striking its head, then the nut is screwed on, thereby ensuring fastening of the shoe.

The bolts used are generally of the self-undercutting and self-expanding type, i.e. capable upon fixing, on the one hand, of enlarging in a conical manner the hole drilled in the concrete at the end of the bolt and, on the other hand, of being expanded there, by the forced deformation of expansion lugs by means of a cone, in such a manner that it remains in contact with the walls of the hole having the diameter achieved in this manner.

The aim of the undercut is to relieve the stresses in the concrete around the hole in which the bolt is anchored. As the concrete does not remain locally prestressed once the bolt has been fixed, it consequently does not have the tendency to spall, in particular at the edge of the slab.

Normally, once the slab has been drilled, the undercut is produced when the bolt is driven into the concrete by striking and/or rotating its threaded head via a sleeve provided with a carbide coating to this end and covering the bolt, then the tightening of the nut results in the expansion of the lugs over a cone rigidly connected to the bolt, on the one hand, as a result of the reduction in the size of the bolt due to the tightening and, on the other hand, as a result of the fact that the lugs are held at this depth by the sleeve.

This fixing or fastening method has several disadvantages:
  the presence of the sleeve means that the concrete has to be drilled to a diameter greater than the diameter of the bolt, e.g. in the case of a bolt having a diameter M12 of the international metric system, it is necessary to drill a hole of 18;
  if the holes in the shoe are not drilled to this diameter, but to the smaller diameter of the bolts, the method also means that the concrete has to be drilled not through the shoe put in place in order to serve as a drilling guide, but before the shoe is placed in position, which may lead to drilling centre distances aligned incorrectly with those of the holes in the shoe;
  as the sleeve has a predetermined length, the bolts can only be used for one single driving depth;
  the undercut formed by the driving-in operation prestresses the concrete around the bolt before the tightening of the nut and therefore before the expansion of the bolt, as a result of which the mounting of the shoe of the guard rail on the slab cannot be controlled properly.

SUMMARY

The aim of this invention is to obviate these disadvantages.

To this end, the applicant firstly proposes a method of fastening a guard rail to a concrete slab by means of a self-expanding and self-undercutting bolt comprising a dowel having expanding lugs and an expansion core, the method comprising a phase consisting in drilling a hole in the slab, a phase consisting in driving the bolt in to a desired depth independent of the depth of the hole, a dynamic tightening phase resulting in the formation of the undercut and a static tightening phase of the guard rail.

The term "dynamic tightening" refers to tightening leading to the displacement of the expansion lugs or of the formation of the undercut with respect to depth.

The term "static tightening", on the other hand, refers to tightening keeping the expansion lugs or the formation of the undercut at the same depth.

The fundamental difference between the method of the invention and that of the prior art is that no undercut is formed when the bolt is driven in, thereby preventing prestressing of the concrete remaining before the terminal static tightening, in particular torsional stress when the undercut is formed by turning the bolt.

The dynamic tightening is advantageously carried out by relative screwing of the dowel and the expansion core to a given depth.

In order to carry out the method of the invention, the applicant additionally proposes a self-expanding and self-undercutting guard rail bolt comprising a dowel and a counter-dowel screwed together by means of their screwing ends, the dowel comprising at its fastening end a guard rail fastening head designed to be driven in rotation and rigidly connected at its screwing end by means of incipient fracture means to a ring provided with expansion lugs, the counter-dowel comprising at its other expansion end an expansion cone and anti-rotation means, the expansion lugs comprising means for forming an undercut.

In addition to the fact that the driving depth can be controlled by virtue of the anti-rotation means, as no retaining sleeve is required for the expansion lugs, the concrete can be drilled to the diameter of the bolt and therefore through the fastening holes in the shoe.

In addition, once the undercut has been formed, the internal stresses of the concrete around the hole are relieved and the concrete consequently does not have the tendency to spall, particularly at the edge of the slab, as is often the case when a guard rail is to be fastened.

The applicant finally proposes a tool for fixing the guard rail bolts according to the invention comprising means for driving them in rotation and complementary means for controlling the depth to which the bolt is driven into an anchoring hole.

As the driving of the bolt into the hole provided in the concrete slab does not depend on the depth of the hole, it can be fastened precisely by the fixing tool without the user having to take any special measures.

BRIEF DESCRIPTION OF THE DRAWINGS

The invention will be more readily understood with the aid of the following description of the bolt of the invention, the tool and the method of fixing this bolt, with reference to the accompanying drawings, in which.

DETAILED DESCRIPTION

Figure 1:
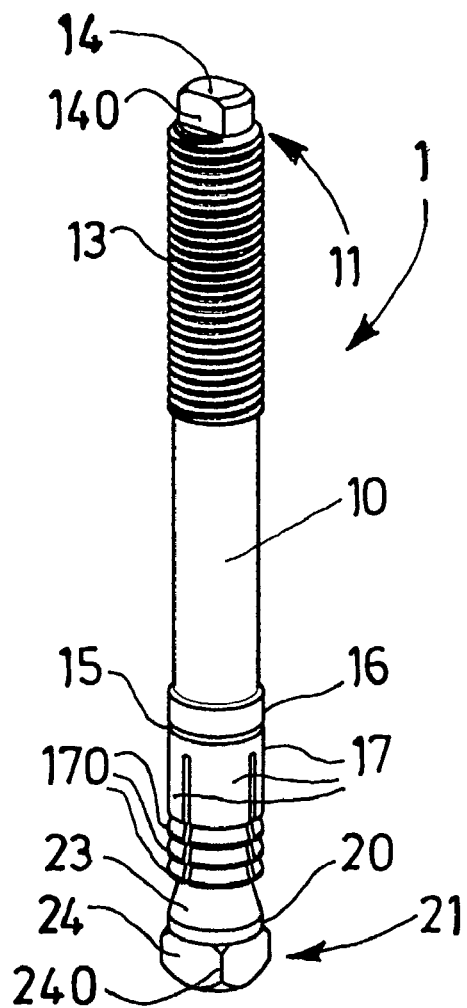
FIGS. 1 and 2 are respectively a perspective view and an axial section of the bolt according to the invention.
Figure 2:
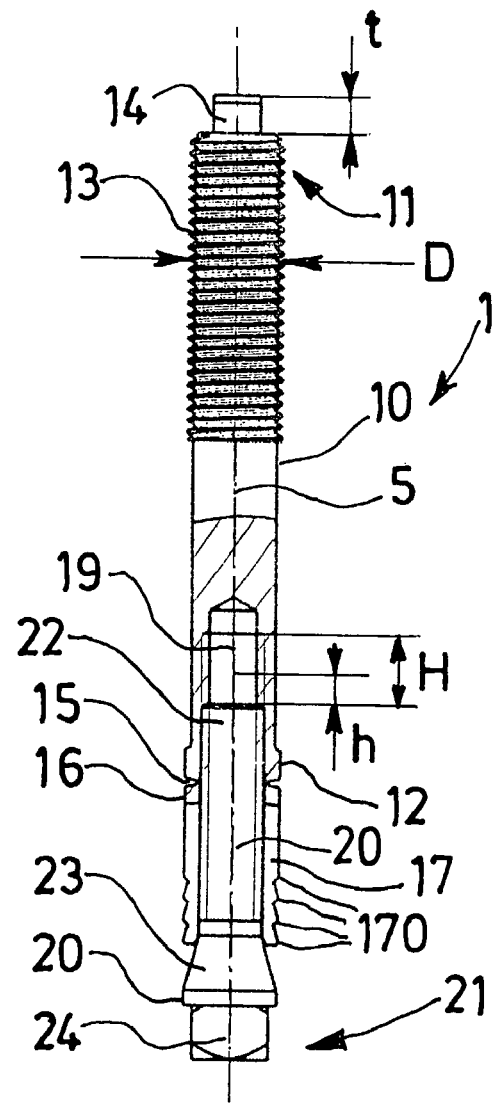

Referring to FIGS. 1 and 2, the guard rail bolt 1 having a nominal diameter D comprises a dowel 10 having an axis 5 and a counter-dowel 20 coaxial with the dowel 10.

The dowel 10 has a generally cylindrical shape and is provided on its first end 11 referred to as the fastening end with a head 13 for fastening the guard rail or any other furniture to be mounted on a concrete slab, in this case a threaded head.

The head 13 is topped by a pin 14 having a height t, designed to be driven in rotation, in this case by two flats 140 which are symmetrical relative to the axis 5 of the bolt.

At the second end 12, referred to as the screwing end, the dowel 10 is provided with a ring 16 comprising expansion lugs 17 rigidly connected to the remainder of the dowel by an incipient fracture groove 15. Fracture occurs when a certain torque C having an axis 5 is applied to the pin 14 of the dowel.

The expansion lugs 17 in this case comprise circular teeth 170 for the formation of an undercut on the wall of the hole drilled in the concrete in order to receive the bolt, as will be described hereinafter.

The counter-dowel 20 comprises on its first end 21, referred to as the expansion end, an expansion cone 23 for the lugs 17 and an anti-rotation head 24 having an, in this case, square cross section, the edges 240 of which project slightly beyond the nominal diameter D of the bolt, or of the hole drilled in the concrete, to a sufficient extent to prevent rotation of the counter-dowel about the axis 5 as a result of the torque C by means of friction.

The counter-dowel 20 is screwed by means of its second screwing end 22 into a tapped bore 19 having an axis 5 provided in the screwing end 12 of the dowel 10.

When the counter-dowel 20 is screwed into the dowel 10 in such a manner that the lugs 17 are flush with the cone 23, the bore 19 still allows the end 22 to be screwed over a length H greater than a certain length h which will be determined hereinafter, and the bolt 1 is ready for use.

Figure 3:
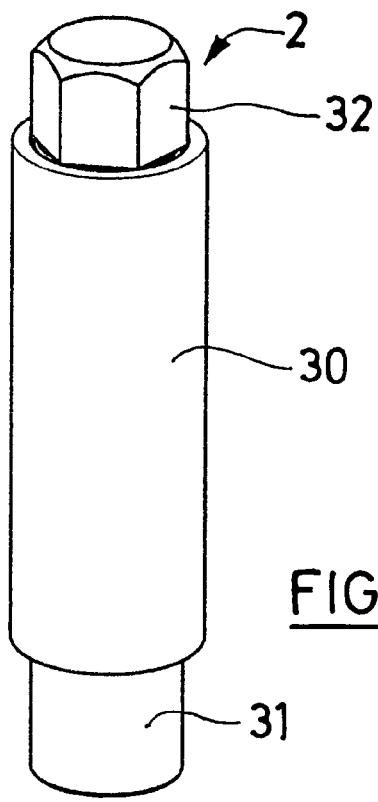
FIGS. 3 and 4 are respectively a perspective view and an axial section of the tool for fixing bolts according to the invention.
Figure 4:
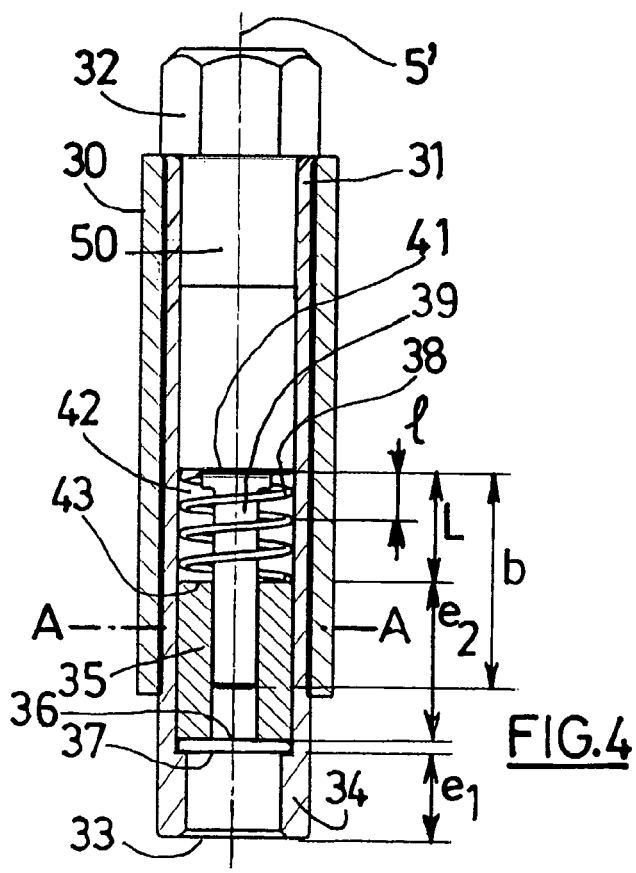
Figure 5:
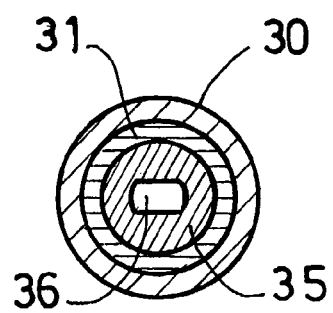
FIG. 5 is a cross section of the fixing tool along the line AA of FIG. 4.

Referring to FIGS. 3 to 5, the tool 2 for fixing the bolt 1, having a generally cylindrical shape and an axis 5', is designed to rotate the dowel 10 about its axis 5 by means of its pin 14 when the bolt 1 is introduced into the hole drilled in the concrete.

To this end, it comprises a cylindrical drive sleeve 35 having a length e2 designed, as will be seen in the cross section of FIG. 5, to follow the contours of the flats 140 of the pin 14 at is lower end 36 when the axes 5 and 5' coincide and when it is positioned on the head 13 of the bolt 1.

This drive sleeve 35 plays freely in translation along the axis 5' guided between two end limits by a stop guide 31. These limits are determined by the upper face 37 of the lower end 34 of the stop guide 31, having a length e1 and a cross section 33 reduced to such an extent that it will not allow for the passage of the sleeve 35, and the upper limit resulting from the limit compression I of a spring 38.

The spring 38 is compressed between the sleeve 35 and the lower face 41 of a plug 50 closing the cylindrical free space containing it. When the maximum axial length of the spring 38 has been reached, the lower end 36 of the sleeve 35 is in contact with the upper face 37 of the lower end 34 of the stop guide 31 and these two faces are then at a distance from the lower face 41 of the plug 50 by a length L.

The spring 38 allows the lower end 36 to be applied constantly to the head 13, thereby holding the pin 14 in the interior of this end.

A spindle 39 having a length b rigidly connected to the plug 50 and having the same cross section as the pin 14 extends the plug until it penetrates into the sleeve 35 and allows it to be driven in rotation when the plug 50 is itself driven in rotation.

To this end, the plug 50 is rigidly connected to a hexagon head 32 by means of which the tool 2 can be rotated, being held by the external sleeve 30 without affecting its rotation about the axis 5'.

Figure 6:
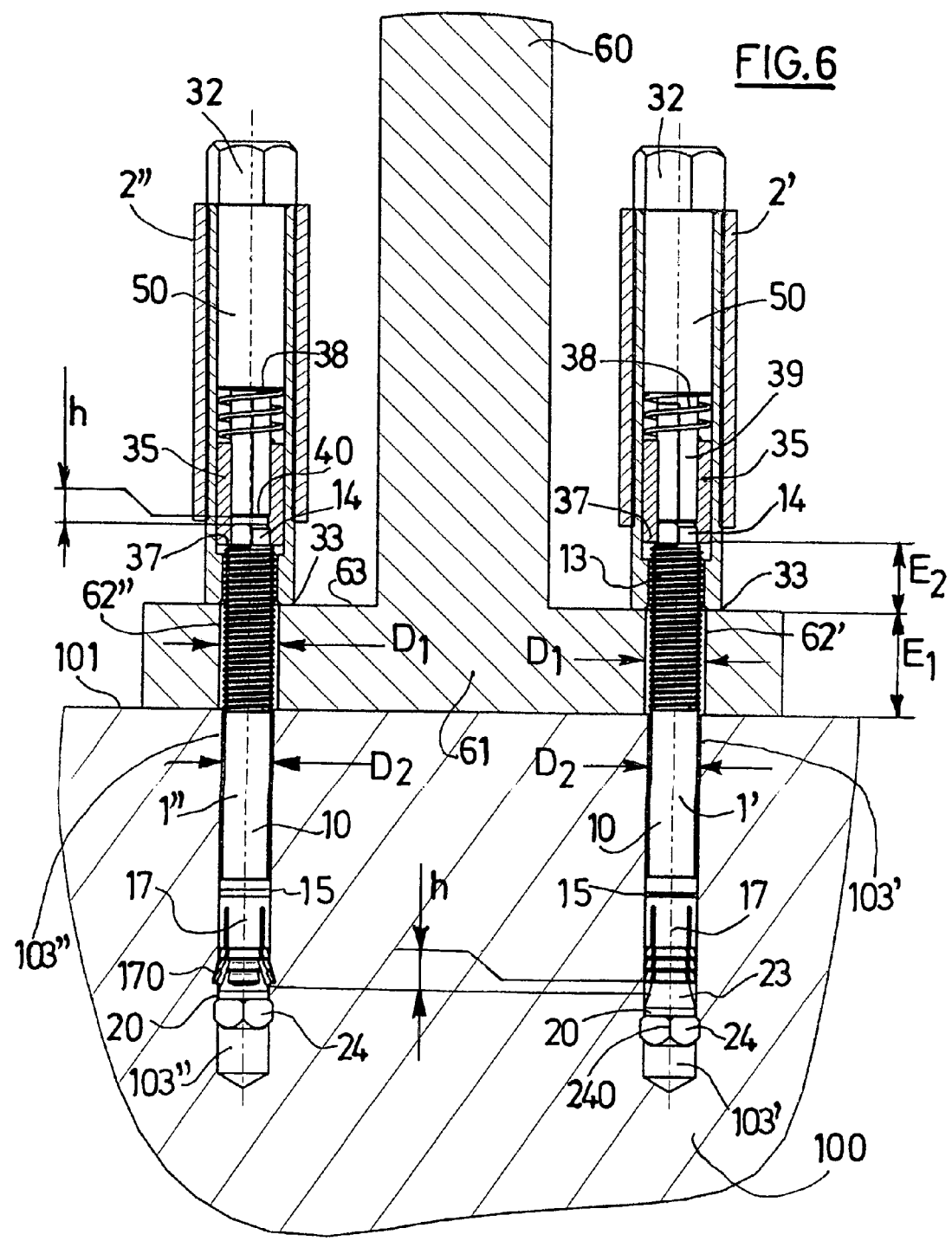
FIG. 6 is an axial section of a guard rail shoe fastened to a concrete slab by means of two bolts according to the invention, each during a different phase of the fixing operation.

The use of the tool 2 and the operation of the bolt 1 will now be described with reference to FIG. 6.

When a shoe 61 of the guard rail 60 having a thickness E1 and comprising two holes 62' and 62" having a diameter D1 compatible with the nominal diameter D is to be fastened to the surface 101 of a concrete slab 100, in a drilling phase, the shoe 61 is placed in position and holes 103' and 103" having a diameter D2 corresponding to the diameter D are drilled in the slab, through the latter.

There is no need for the drilling length to be precise. It simply has to be larger than the driving depth of the bolt.

As the counter-dowel 20 has been screwed into the dowel 10 until the lugs 17 lightly touch the cone 23, in a driving phase, the bolt 1' ready for use is forced into the hole 62' to the desired depth, in this case in such a manner that the threaded part of the head 13 projects from the shoe 61 by a desired height E2 generally equal to the sum of the thicknesses of a fastening nut and a washer (not shown) increased by the length h. In FIG. 6, the bolt 1' is shown in this position and in this state.

The anti-rotation head 24 of the counter-dowel 20 holds the bolt 1' at this depth.

The axis 5' of the tool 2' and the axis 5 of the bolt are made to coincide so that the pin 14 engages in the lower end 36 of the sleeve 35 returned by the spring 38 to the pin 14 and the tool is pressed in order to bring the lower face 33 of the stop guide 31 to bear against the upper face 63 of the shoe 61.

Then, during a dynamic tightening phase, the undercut is formed by the teeth 170 of the lugs 17 by rotating the head 32 by means of an allen key.

In so doing, the plug 50, the spindle 39 rigidly connected thereto, the sleeve 35 and the pin 14 are rotated by virtue of the shape of the cross section of the contact surfaces between the sleeve, the spindle and the pin, the dowel 10 being screwed on to the counter-dowel 20 and held fixed in rotation and translation by the anti-rotation head 24.

When it is driven in, the dowel 10 drives the lugs 17, which are expanded by the cone 23 to a predetermined depth h and thus form the undercut in the hole 103'. The tightening torque due to the screwing gradually increases to the value C required to obtain fracture of the groove 15. The undercut is produced. In FIG. 6, the bolt 1" is shown in this position and in this state.

Upon the fracture of the groove 15, the torsional stresses are relieved and the ring 16 locked by the undercut locks the dowel 10 with respect to its depth, the dowel then drawing the counter-dowel 20, and with it the cone 23, towards it from that point on.

After the anchoring operation and during a static tightening phase, the fastening nut is screwed on to the threaded head 13 of the bolt in order to mount the guard rail by firmly fastening the shoe 61. In the event of overload, abnormal tensile forces may result in additional expansion of the lugs 17 and the dowel 10 can then be drawn very slightly towards the exterior of the hole.

During this tightening phase, the bolt 1' thus remains driven in to the desired depth corresponding to the bolt projecting above the surface 101 of the concrete by a height E1+E2.

The tool 2 is dimensioned to facilitate and ensure the observance of this height so that the fastening nut is screwed fully on to the threaded head 13, without the latter extending beyond it.

In particular, irrespective of the thickness E1 of the shoe 61, the following must apply:

$$e1+h<E2<e1+L-1.$$

The height h can be determined precisely as a function of the torque C. It depends on the properties of the concrete. The following must therefore apply:

$$L-1>h,$$

thereby ensuring an optimum dynamic tightening phase.

The tool 2 moreover makes it possible to control the depth to which the bolt is driven into the hole 103. To this end, the following must apply:

$$e2+1-b=t,$$

and $$e2+e1+L-b=E2+t-h.$$

Firstly, the length e2 of the sleeve 35 must be equal to the length b of the spindle increased by the length t of the pin 14, but reduced by the minimum length 1 of the compressed spring 38.

Secondly, the length e1 of the reduced section of the lower end 34 of the stop guide 31 is a function of the desired projection of the bolt above the surface 63 of the shoe 61, E2−h, i.e. the thickness of the fastening nut.

If these conditions are satisfied, the bolt 1 can be driven through the shoe into the hole 103' or 103" in the slab 100 by hammering the hexagon head 32 of the tool 2 in place on the bolt until the tool 2 comes to bear via its lower face 33 against the upper face 63 of the shoe.

By using the tool 2 in this manner, the desired driving depth of the bolt, or the projection thereof from the shoe, is obtained in a very precise manner.

The advantage of this method resides in the fact that it comprises, after the drilling of the slab, a first phase consisting in driving the bolt in to a depth closely dependent on the desired driving depth, during which no undercut is formed, thereby preventing prestressing of the concrete before anchoring, then a second dynamic tightening phase, the dowel always being driven in while the counter-dowel is static, thereby resulting in the formation of the undercut, and finally a third static tightening phase, continuing the expansion of the bolt, with only the counter-dowel moving, drawn by the dowel.

The invention claimed is:

1. A self-expanding and self-undercutting bolt, comprising a dowel and a counter-dowel:
    said dowel including:
        a fastening end configured to be rotatably driven;
        a first screwing end opposite to the fastening end;
        a ring connected to the first screwing end and having expansion lugs for forming an undercut in a hole in which the bolt is to be fastened;
    said counter-dowel including:
        an expansion core;
        a second screwing end on one of opposite sides of the expansion core and threadedly engageable with the first screwing end for screwing the counter-dowel to the dowel; and
        an anti-rotation head on the other side of the expansion core, and radially projecting beyond a nominal diameter of the dowel to engage a wall of the hole in which the bolt is to be fastened to prevent rotation of the counter-dowel about an axis of the bolt;
    wherein the dowel further comprises an incipient fracture portion, and the ring is connected to the first screwing end of the dowel by the incipient facture portion which is configured to fail at a predetermined torque level that occurs before the counter-dowel is fully screwed to the dowel, thereby permitting the counter-dowel to be further screwed to the dowel after the ring and the expansion lugs are disconnected from the first screwing end due to the failure of the incipient facture portion.

2. The self-expanding and self-undercutting bolt according to claim 1, wherein the counter-dowel is coaxial with the dowel when the counter-dowel is screwed to the dowel.

3. The self-expanding and self-undercutting bolt according to claim 1, wherein the fastening end of the dowel head comprises:
    an external thread; and
    a pin configured to be engaged and rotatably driven by a tool.

4. The self-expanding and self-undercutting bolt according to claim 1, wherein the first screwing end of the dowel comprises an internally threaded bore, and second screwing end of the counter-dowel has a matching external thread configured to be screwed into the bore.

5. The self-expanding and self-undercutting bolt according to claim 1, wherein the expansion lugs comprise teeth for forming the undercut.

6. A self-expanding and self-undercutting bolt, comprising a dowel and a counter-dowel:
    said dowel including:
        a fastening end configured to be rotatably driven;
        a first screwing end opposite to the fastening end;
        a ring connected to the first screwing end and having expansion lugs for forming an undercut in a hole in which the bolt is to be fastened;
    said counter-dowel including:
        an expansion core;
        a second screwing end on one of opposite sides of the expansion core and threadedly engageable with the first screwing end for screwing the counter-dowel to the dowel; and
        an anti-rotation head on the other side of the expansion core to prevent rotation of the counter-dowel about an axis of the bolt;
    wherein
    the dowel further comprises an incipient fracture portion, and the ring is connected to the first screwing end of the dowel by the incipient facture portion which is configured to fail at a predetermined torque level that occurs before the counter-dowel is fully screwed to the dowel, thereby permitting the counter-dowel to be further screwed into the dowel after the ring and the expansion lugs are disconnected from the first screwing end due to the failure of the incipient facture portion.

7. The self-expanding and self-undercutting bolt according to claim 6, wherein the counter-dowel is coaxial with the dowel when the counter-dowel is screwed to the dowel.

8. The self-expanding and self-undercutting bolt according to claim 6, wherein the fastening end of the dowel comprises:
   an external thread; and
   a pin configured to be engaged and rotatably driven by a tool.

9. The self-expanding and self-undercutting bolt according to claim 6, wherein the first screwing end of the dowel comprises an internally threaded bore, and second screwing end of the counter-dowel has a matching external thread configured to be screwed into the bore.

10. The self-expanding and self-undercutting bolt according to claim 6, wherein the expansion lugs comprise teeth for forming the undercut.

11. A method of fastening a guard rail to a concrete slab by means of a self-expanding and self-undercutting bolt of claim 6, the method comprising:
   forming a hole in the slab;
   axially driving the bolt to a desired depth in the hole;
   rotationally driving the dowel, while the counter-dowel is static due to an engagement of the anti-rotation head with the hole, to form an undercut in the hole until the incipient fracture portion fails and separates the first screwing end of the dowel from the expansion lugs which are locked in the undercut;
   further rotationally driving the dowel after the incipient fracture portion has failed to draw the counter-dowel toward the dowel; and
   fastening the guard rail to the slab by engaging a nut with the fastening end of the dowel.

* * * * *